United States Patent
Jang et al.

(10) Patent No.: US 7,204,751 B2
(45) Date of Patent: Apr. 17, 2007

(54) METHOD AND APPARATUS FOR FILTERING CONTAMINANTS

(75) Inventors: Ruei-Hung Jang, Singhuang (TW); Chun-Li Fang, Pingjhen (TW); Wen-Hung Tseng, Juochiao Town (TW); Tsung-Chi Hsieh, Tamshui Town (TW); Shih-Shiung Chen, Hsin-Chu (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 160 days.

(21) Appl. No.: 10/614,564

(22) Filed: Jul. 7, 2003

(65) Prior Publication Data

US 2005/0066633 A1  Mar. 31, 2005

(51) Int. Cl.
 *B01L 1/04* (2006.01)
(52) U.S. Cl. .................................. 454/187; 55/385.2
(58) Field of Classification Search .............. 454/56, 454/57, 187; 55/385.2; 432/152, 176, 199; 134/1.3
 See application file for complete search history.

(56) References Cited

U.S. PATENT DOCUMENTS

| | | | | |
|---|---|---|---|---|
| 1,827,194 A * | 10/1931 | Grothe | ........................ | 432/199 |
| 3,942,964 A * | 3/1976 | Shuler | ........................ | 55/494 |
| 4,098,174 A * | 7/1978 | Landy | ........................ | 454/57 |
| 4,100,847 A * | 7/1978 | Norton | ........................ | 454/57 |
| 4,778,382 A * | 10/1988 | Sakashita | ..................... | 432/239 |
| 5,271,545 A * | 12/1993 | Boswell et al. | ............... | 228/43 |
| 5,316,560 A * | 5/1994 | Krone-Schmidt et al. | .. | 55/385.2 |
| 5,413,527 A * | 5/1995 | Dansui et al. | ................ | 454/57 |
| 5,700,190 A * | 12/1997 | Johnson et al. | ............... | 454/57 |
| 5,711,705 A * | 1/1998 | Krainiak et al. | .............. | 454/57 |
| 5,944,602 A * | 8/1999 | Grundy | ...................... | 454/187 |
| 6,079,407 A | 6/2000 | Lai | | |
| 6,080,060 A * | 6/2000 | Larsson | ....................... | 454/187 |
| 6,158,432 A | 12/2000 | Biondi et al. | | |
| 6,176,305 B1 | 1/2001 | Haglid | | |
| 6,183,358 B1 * | 2/2001 | Adair, Jr. | ..................... | 454/187 |
| 6,368,208 B1 * | 4/2002 | Minoshima | .................. | 454/187 |
| 6,567,267 B1 * | 5/2003 | Wang | .......................... | 361/695 |
| 6,869,457 B2 * | 3/2005 | Nakagawa | ................. | 55/385.2 |
| 2002/0108334 A1 * | 8/2002 | Rapisarda et al. | ......... | 52/302.1 |
| 2003/0050005 A1 * | 3/2003 | Nakao | ......................... | 454/187 |
| 2005/0017617 A1 * | 1/2005 | Becke | ......................... | 312/404 |

* cited by examiner

*Primary Examiner*—Gregory Wilson
(74) *Attorney, Agent, or Firm*—Haynes and Boone, LLP

(57) ABSTRACT

A self-contained ventilator includes a housing having a support member for supporting a pollution source. A filter is further disposed in the housing for filtering contaminants emitted from the pollution source. A conduit is adapted to connect to the housing to provide non-housing communication between portions of the housing. A fan is situated in the conduit to generate an airflow that follows a path through the housing, through the conduit, and back to the housing. The airflow entrains the contaminants such that the contaminants are captured by the filter upon passage of the airflow through the filter.

17 Claims, 3 Drawing Sheets

METHOD AND APPARATUS FOR FILTERING CONTAMINANTS

BACKGROUND

The present invention relates generally to semiconductor manufacturing, and more particularly to a self-contained ventilator for reducing toxic gas emission associated with semiconductor manufacturing processes.

Semiconductor devices are typically fabricated using a sequence of chemical and/or mechanical processing operations performed simultaneously or sequentially on one or more semiconductor wafers. This fabrication typically takes place in a clean room, which is an enclosed ultra-clean space having a minimal amount of airborne particles, and which is strictly environmentally controlled. The wafers undergo various fabrication processes in the clean room, including thermal oxidation, masking, etching, and doping. Such processes lead to the development of a semiconductor device.

During the manufacturing processes, contaminants such as particles, organics, gases, metallics, and the like, may adhere or adversely affect the wafer, thereby adversely affecting characteristics of the processed semiconductor device. Also, such contaminants can also be released into the clean room environment, where they may be hazardous to people or the environment. Accordingly, there is a need to control the emission of contaminants during and between the manufacturing processes.

SUMMARY

A technical advance is provided by a new and improved apparatus and method for filtering contaminants. In one embodiment, a self-contained ventilator for filtering contaminants is provided. The self-contained ventilator includes a housing having a support member for supporting the pollution source and a filter vertically spaced from the support member for filtering contaminants emitted from the pollution source, the filter and a lower portion of the housing defining a first converging room. The self-contained ventilator also includes a conduit connecting the first converging room to an upper portion of the housing such that a flow path is defined through the housing and conduit, and a fan for generating an airflow that follows the flow path.

In another embodiment, a ventilator is provided for filtering contaminants introduced from a wafer processing system. The ventilator includes a housing separable from the wafer processing system for receiving and storing one or more wafers, a filter positioned inside the housing, a conduit connected to the housing, and an airflow generator for providing an airflow along a closed-loop flow path defined through the housing, the conduit, and the filter.

In another embodiment, a method is provided for filtering contaminants associated with semiconductor processing. The method includes providing a movable housing for storing one or more semiconductor wafers, the housing having a filter disposed therein. A conduit is provided for connecting a portion of the housing to another portion of the housing. An airflow is generated that follows a flow path defined through the housing and the conduit such that the airflow entrains contaminants within the housing to filter the contaminants when passing through the filter.

In another embodiment, a method is provided for filtering contaminants emitted from a pollution source. The method includes providing a self-contained housing having a support member and a filter disposed interiorly therein, the filter being vertically spaced from the support member. A conduit connects a portion of the housing to another portion of the housing such that a flow path is defined through the housing and the conduit. The pollution source is placed on the support member and the interior of the housing is isolated from an area surrounding the housing. An airflow is generated that follows the flow path such that the airflow entrains the contaminants emitted from the pollution source and filters the contaminants when passing through the filter.

BRIEF DESCRIPTION OF THE DRAWINGS

FIG. 1b is a perspective view of a wafer processing kit to be housed in the self-contained ventilator of FIG. 1a.

FIG. 2 is a sectional view of the ventilator of FIG. 1a.

DESCRIPTION

Figure 1A:
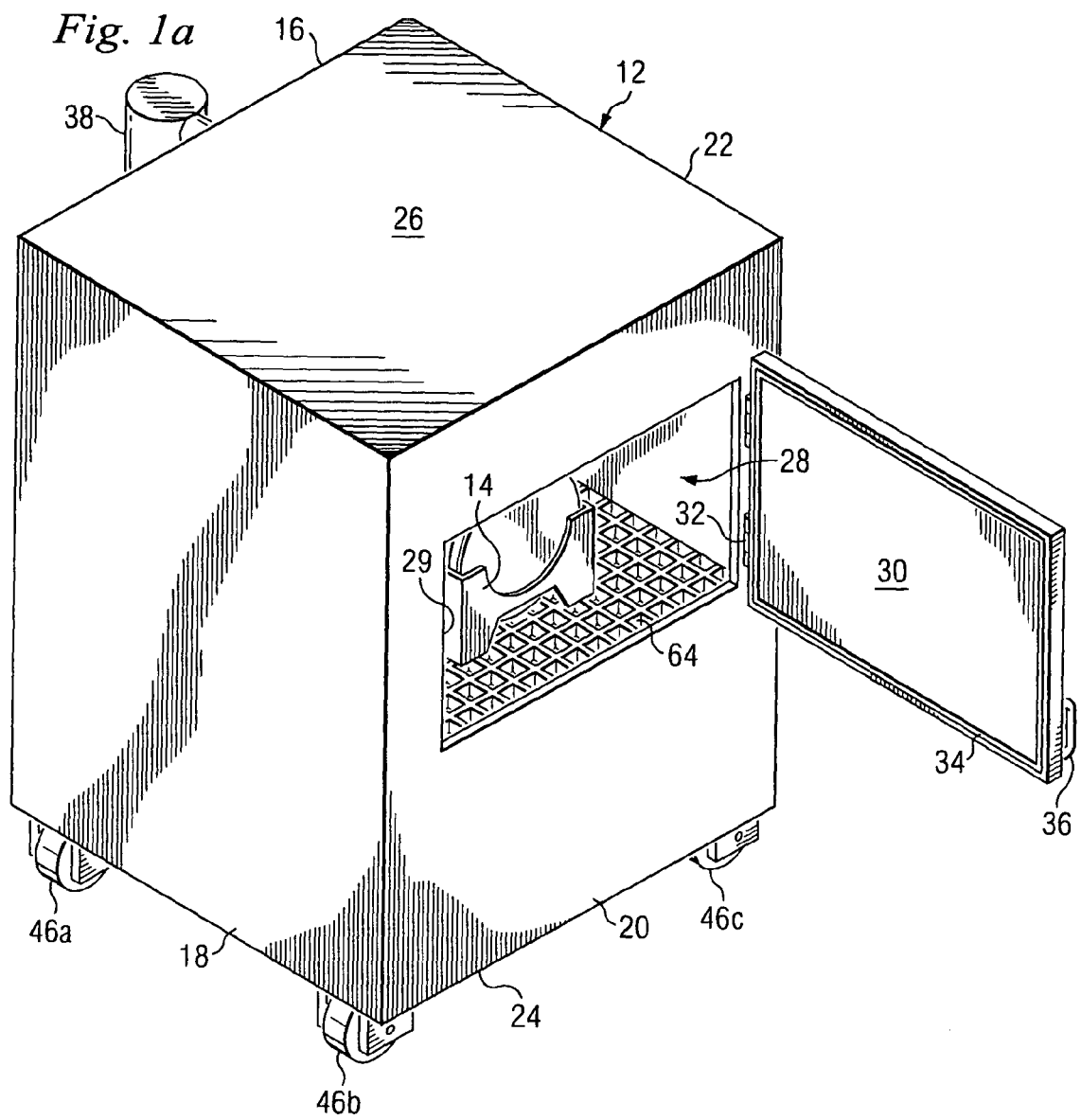
FIG. 1a is a perspective view of a self-contained ventilator according to an embodiment of the present disclosure.
Figure 1B:
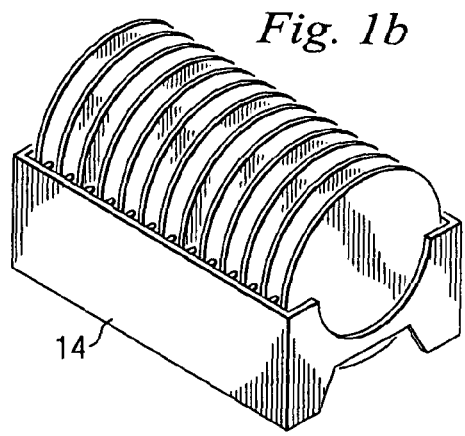

Referring to FIG. 1a, a self-contained ventilator is generally referred to by reference numeral 10. The ventilator 10 includes a free-standing housing 12 for enclosing a wafer processing kit or boat 14 (FIG. 1b). The wafer processing kit 14 is of a conventional design, and as such, includes wafers having undergone various semiconductor manufacturing processes. It is understood that the ventilator 10 may be situated in a clean room (not depicted).

The housing 12 includes a set of walls 16, 18, 20 and 22 integrally formed with and extending vertically between a bottom 24 and a top 26, thereby defining an interior volume 28 of the housing. An opening 29 is formed in the wall 20 to provide access to the interior volume 28 of the housing 12. A door 30, connected to the housing 12 via a conventional hinge 32, is provided for enclosing and sealing the interior volume 28.

The door 30 includes a peripheral rubber magnet 34 for adhering the door to the housing 12 when the door is in a closed position. A conventional handle 36 is affixed to the door 30 via any conventional means for facilitating opening and closing of the door.

Figure 2:
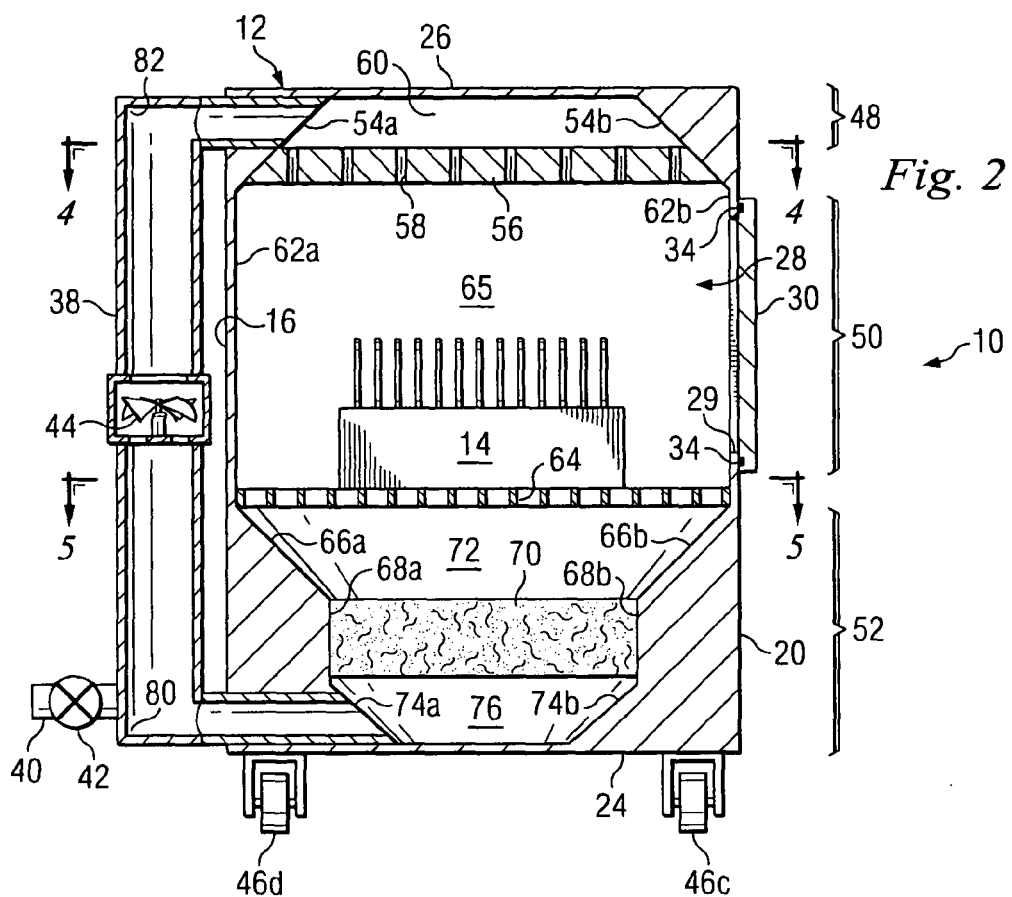

Referring to FIGS. 1a and 2, a conduit 38 is connected to the housing 12 for reasons to be described. The conduit 38 includes an exhaust port 40 having a valve 42 for adapting the ventilator to a local exhaust system (not shown) if desired. A fan 44 is disposed within the conduit 38 for generating an airflow as will be described. A plurality of wheels 46a–d (wheel 46d is not shown) are connected to and disposed beneath the housing 12 for aiding the mobility of the housing.

Figure 3:
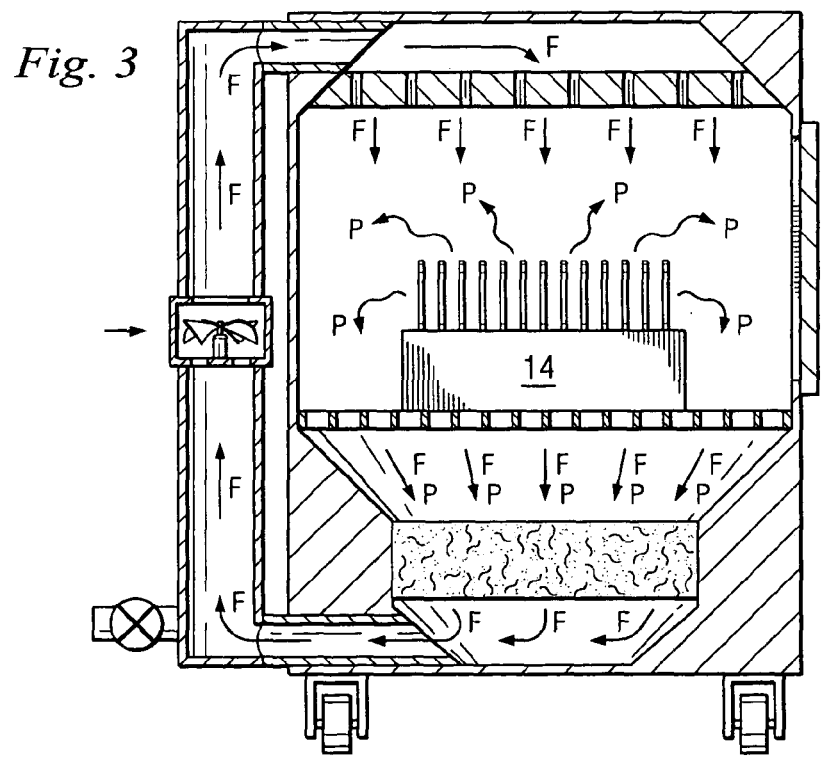
FIG. 3 is a sectional view of the ventilator of FIG. 1a depicting a flow path.

Referring to FIGS. 2 and 3, and more particularly to the housing 12, the interior volume 28 is shaped to define a desired flow path denoted by the reference arrows F (FIG. 3). The flow path F within the housing 12 is generally divergent in an upper portion 48 of the housing, uniform in a central portion 50 of the housing, and convergent in a lower portion 52 of the housing. The flow path F will be more fully described with respect to the operation.

The upper portion 48 of the housing 12 includes a pair of corresponding interior surfaces 54a, 54b that diverge from one another from the top 26 to the walls 16 and 20, respectively. A distributor 56, vertically spaced from the top 26, is disposed between the surfaces 54a, 54b in any conventional manner.

Figure 4:
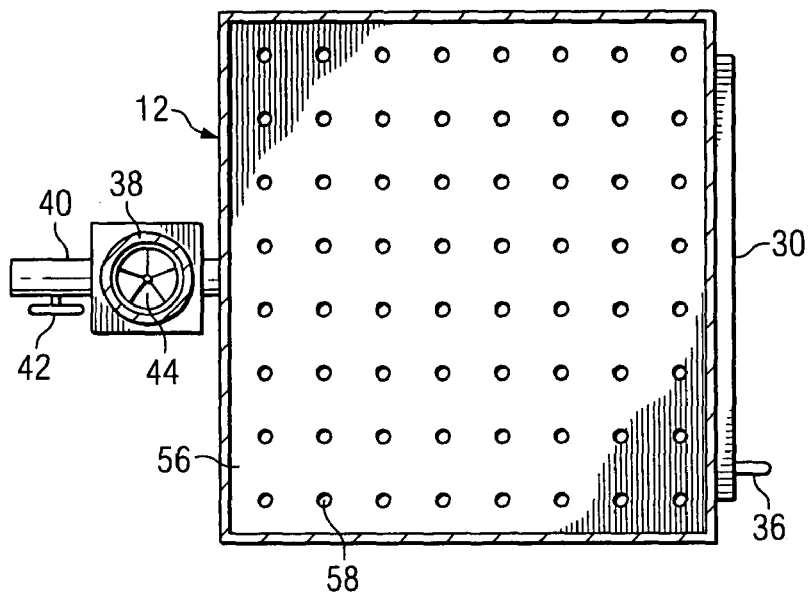
FIG. 4 is a top sectional view of the ventilator of FIG. 2 taken along the line 4—4.

The distributor 56, as further depicted in FIG. 4, is a plate-like structure formed to uniformly distribute the flow path F, and as such, includes a plurality of uniformly distributed apertures 58 formed there through. The upper portion 48 of the housing 12 and the distributor 56 cooperate to define a diverging room 60.

The central portion 50 of the housing includes a pair of corresponding substantially parallel interior surfaces 62a, 62b that vertically extend from the surfaces 54a, 54b, respectively. The interior surface 62b includes the opening 29 formed through the wall 20. A support member 64, vertically spaced from the distributor 56, is disposed between the surfaces 62a, 62b in any conventional manner.

Figure 5:
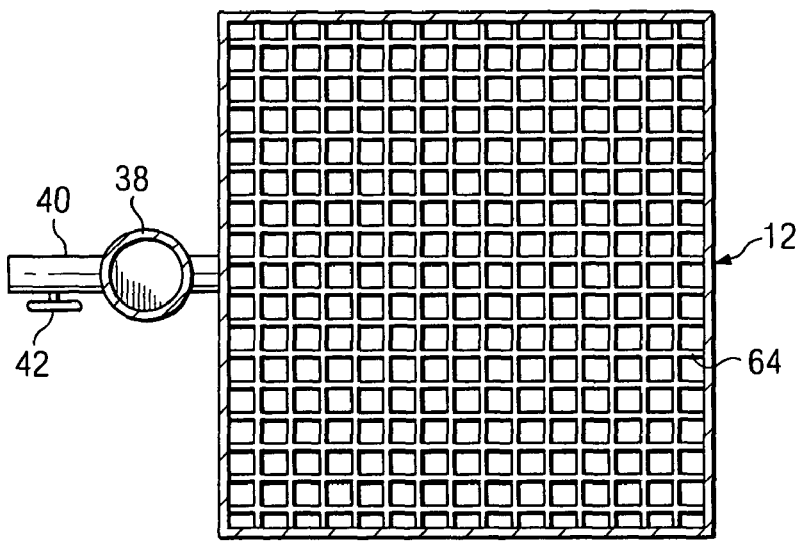
FIG. 5 is a top sectional view of the ventilator of FIG. 2 taken along the line 5—5.

The support member 64, as further depicted in FIG. 5, supports the wafer processing kit 14 while also allowing for continuation of the flow path F there through. As such, the support member 64 may take the form of a grid. As depicted in FIG. 3, the wafer processing kit 14 emits contaminants (denoted by the reference arrows P), which may be in the form of toxic gas, as will be further described with respect to the operation. The distributor 56, the interior surfaces 62a, 62b, and the support member 64 cooperate to define a compartment 65.

The lower portion 52 of the housing 12 includes a pair of corresponding interior surfaces 66a, 66b that converge toward one another from the surfaces 62a, 62b. A pair of corresponding interior surfaces 68a, 68b vertically extend from the surfaces 66a, 66b to further define the shape of the interior volume 28 in the lower portion 52 of the housing 12.

A filter 70, vertically spaced from the support member 64, is disposed between the surfaces 68a, 68b in any conventional manner. For instance, the filter 70 may be slidably disposed in notches (not depicted) formed in the surfaces 68a, 68b to facilitate easy insertion and removal of the filter 70. The filter 70 may be a conventional active carbon filter, and as such, absorbs and captures the harmful contaminants P emitted from the wafer processing kit 14 as will be further described with respect to the operation. The support member 64, the surfaces 66a, 66b, and the filter 70 cooperate to define a converging room 72.

The lower portion 52 of the housing 12 further includes a pair of corresponding surfaces 74a, 74b that extend from the surfaces 68a, 68b and converge toward one another and terminate at the bottom 24 of the housing. The bottom 24, the filter 70, and the surfaces 74a, 74b cooperate to define a converging room 76.

The lower portion 52 of the housing 12 is adapted to receive a portion of the conduit 38 in order to establish communication between the converging room 76 and the conduit 38. The conduit 38 connects to the lower portion 52 of the housing 12 in any conventional manner. Thus, the flow path F continues from the converging room 76 and into the conduit 38.

The flow path F is further defined through an elbow 80 of the conduit 38, vertically through the conduit, and through another elbow 82 of the conduit. The upper portion 48 of the housing 12 is adapted to receive a portion of the conduit 38 in order to establish communication between the conduit 38 and the diverging room 60. The conduit 38 connects to the upper portion 48 of the housing 12 in any conventional manner. Thus, the flow path F continues from the conduit 38 and into the diverging room 60 to complete the closed-loop flow path.

Referring again to FIGS. 1a and 1b, in operation, the wafer processing kit 14 is placed inside the ventilator 10 to rest on the support member 64. The door 30 is then closed to isolate the interior volume 28 of the housing 12 from the ambient surroundings. Having undergone semiconductor manufacturing processes, such as a wet cleaning process, the wafer processing kit 14 emits the contaminants P (FIG. 3) into the air of the interior volume 28.

Referring to FIGS. 2 and 3, the fan 44 is then actuated to generate an airflow within the ventilator 10 that follows the flow path F. Upon actuation of the fan 44, the airflow follows the flow path F through the conduit 38 and into the diverging room 60. The diverging room 60 buffers the airflow such that the airflow spreads upon exiting the conduit 38.

From the diverging room 60, the airflow passes through the apertures 58 (FIG. 4) of the distributor 56 such that the airflow is substantially uniformly distributed into the compartment 65. Upon entry into the compartment 65, the airflow passes adjacent to the wafer processing kit 14, thereby entraining the contaminants P in the direction of the flow path F.

The airflow with entrained contaminants P then passes through the support member 64 and enters the converging room 72 where the airflow is accelerated due to the decreasing volume of the converging room. The acceleration of the airflow in the converging room 72 generates a flow field having lower pressure conditions relative to the compartment 65. Thus, the low pressure flow conditions and the momentum of the airflow combine to create a drawing force sufficient to exhaust a substantial amount of the contaminants P into the filter 70.

Upon passing through the filter 70, the airflow enters the converging room 76 where the airflow accelerates further and enters the conduit 38. As the filter 70 captured a substantial amount of the contaminants P from the airflow, the airflow entering the conduit 38 via the converging room 76 is substantially cleaner than the airflow entering the filter.

The airflow continues through the first elbow 80 of the conduit 38, vertically through the conduit, and through the second elbow 82 of the conduit. The airflow exits the conduit 38 and enters the diverging room 60 to repeat the above-described flow path F.

As the airflow continually circulates through the ventilator 10, the contaminants P are continually captured by the filter 70. Thus, operation of the ventilator 10 allows the filter 70 to capture a technically-feasible maximum amount of contaminants P.

The self-contained ventilator 10 offers the advantage of continuous filtering of the contaminants P in a closed-loop system. Thus, communication between the interior volume 28 and the surrounding environment is minimized, which minimizes the emission of contaminants P from the wafer processing kit 14 to the ambient surroundings. Furthermore, use of the ventilator 10 eliminates the need to use a localized exhaust system to exhaust the contaminants P emanating from the wafer processing kit 14. Instead, the self-contained ventilator 10 may be moved to various locations, including locations beyond the clean room, while still maintaining a closed environment and operating to filter the contaminants P. The ventilator 10 is also easy to clean and maintain as the filter 70 can be easily replaced.

Figure 6:
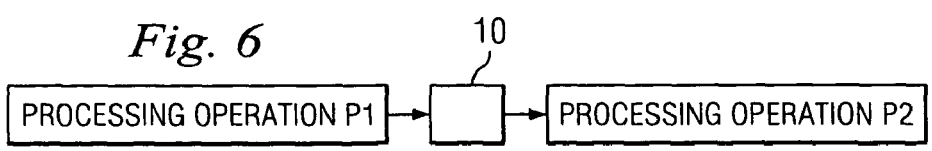
FIG. 6 is a diagrammatic view of a wafer processing system incorporating a self-contained ventilator.

Referring to FIG. 6, providing the ventilator 10 separable from the wafer processing system is advantageous due to the protection afforded to the wafer processing kit 14 when traveling between facilities. For instance, the wafer processing system may include processing operations, such as P1 and P2, that are located in entirely different facilities. As such, providing a movable, self-contained ventilator to house the wafer processing kit 14 during movement between processing operations is beneficial in protecting against harm to the environment and harm to the wafers.

The ventilator 10 further guards against the harmful effects of corrosion of the wafers in the wafer processing kit 14. For example, if a wafer includes a layer, such as a metal layer, that is adversely affected by its environment, placing the wafer in the ventilator 10 between processing operations P1 and P2 can extend the metal corrosion time.

While the invention has been particularly shown and described with reference to embodiments thereof, it is understood by those skilled in the art that various changes in form and detail may be made therein without departing from the spirit and scope of the invention. For example, any number of support members 64 may be added between the surfaces 62a, 62b such that a plurality of wafer processing kits 14 may be housed within the ventilator 10. Any number of wafer processing kits 14 may be supported by each support member 64. Moreover, the support member 64 may be formed of any compatible material such as Teflon or stainless steel. Furthermore, a plurality of doors 30 may be used with the ventilator 10 to accommodate an increased number of support members 64 and wafer processing kits 14.

Still further, a plurality of distributors 56 and filters 70 may be used to accommodate various sizes of the ventilator 10. The distributor 56 is not limited to the apertures 58 as described. Rather, the distributor 56 may take any form so long as the airflow is distributed there through. In some embodiments, the distributor 56 may be removed. Furthermore, the filter 70 is not limited to an active carbon filter as described. Rather, the filter 70 may take a variety of forms so long as the filter captures a substantial amount of contaminants P according to the present disclosure.

Moreover, the conduit 38 may connect to the housing 12 in any conventional manner. In one example, a bore may be formed through the housing 12 to communicate the diverging room 60 and/or the converging room 76 with the ends of the conduit 38, respectively, when the conduit is coupled to the exterior surface of the wall 16. Additionally, the conduit 38 may be formed of several connecting members, or it may be a unitary structure. Still further, the exhaust port with valve 42 may be removed.

Furthermore, the ventilator 10 is not limited to use with wafer processing kits 14. Rather, the ventilator 10 may be used to house various other pollution-generating sources.

Furthermore, the flow path F is defined generally through the housing and conduit without regard to specific starting and ending points. As such, the fan 44 may be situated at any position within the ventilator 10 so long as an airflow is generated that follows the general flow path F.

Moreover, the orientation of the elements within the housing are not limited to the orientation as described. For example, the diverging room 60 may be formed in the lower portion 52 of the housing 12 with the remaining elements situated in reverse order from that described above. In such an embodiment, the flow path F will be reversed as well.

It is also understood that all spatial references, such as "vertically", "top," "bottom," "upper," "lower," "convergent," and "divergent" are for illustrative purposes only and can be varied within the scope of the invention. Accordingly, all such modifications are intended to be included within the scope of this invention as defined in the following claims.

What is claimed is:

1. A self-contained ventilator, comprising:
   a housing having a support member for supporting a pollution source and a filter vertically spaced below the support member for filtering contaminants emitted from the pollution source, the filter and a lower portion of the housing defining a first converging room, the housing also having a distributor vertically spaced above the support member, wherein the distributor comprises a plate having a plurality of apertures formed therethrough;
   a conduit connecting the first converging room to an upper portion of the housing such that a flow path is defined through the housing and conduit; and
   a fan for generating an airflow that follows the flow path.

2. The ventilator of claim 1 wherein the support member is a grid.

3. The ventilator of claim 1 wherein the filter is an active carbon filter.

4. The ventilator of claim 1 wherein the pollution source is a wafer processing kit having undergone semiconductor manufacturing processes.

5. The ventilator of claim 1 wherein the distributor and an upper portion of the housing cooperate to define a diverging room.

6. The ventilator of claim 5 wherein the distributor and the support member cooperate to define a compartment.

7. The ventilator of claim 6 wherein the support member, the filter, and a lower portion of the housing cooperate to define a second converging room.

8. The ventilator of claim 7 wherein the diverging room, the distributor, the compartment, the support member, the second converging room, the filter, the first converging room, and the conduit are arranged to direct the flow path from the diverging room, through the distributor, through the compartment, through the support member, through the second converging room, through the filter, through the first converging room, through the conduit, and back to the diverging room.

9. The ventilator of claim 1 further comprising at least one wheel connected thereto for providing the ventilator with mobility.

10. The ventilator of claim 1 further comprising a door for providing access to the interior of the housing.

11. The ventilator of claim 10 wherein the door includes a peripheral rubber magnet for adhering the door to the housing when the door is in a closed position.

12. The ventilator of claim 1 wherein the fan is configured to generate airflow that entrains the contaminants to exhaust the contaminants into the filter.

13. A ventilator for filtering contaminants introduced from a wafer processing system, the ventilator comprising:
   a housing separable from the wafer processing system for receiving and storing one or more wafers, wherein the one or more wafers forms a pollution source;
   a distributor positioned inside the housing above the pollution source, the distributor comprising a plate having a plurality of apertures formed therethrough;
   a filter positioned inside the housing below the pollution source and disposed to filter contaminants emitted from the pollution source;
   a conduit connected to the housing and configured to direct airflow from adjacent the filter to a top portion of the housing; and
   an airflow generator for providing an airflow along a closed-loop flow path defined through the housing, the conduit, and the filter.

14. The ventilator of claim 13 further comprising:
   a moving structure so that the ventilator can be moved from the wafer processing system to another wafer processing system while the airflow generator provides the airflow along the closed-loop flow path.

15. A method for filtering contaminants, comprising:

providing a movable housing for storing one or more semiconductor wafers, the housing having a filter and a distributor disposed therein, the distributor comprising a plate having a plurality of apertures formed therethrough;

providing a conduit connecting a portion of the housing to another portion of the housing, the conduit being arranged to direct airflow from adjacent the filter to a top portion of the housing; and generating an airflow that follows a flow path defined through the distributor, past the wafers, through the filter, and through the conduit such that the airflow entrains contaminants within the housing to filter the contaminants when passing through the filter.

16. A method for filtering contaminants emitted from a pollution source, comprising:

providing a self-contained housing having a support member, a filter, and a distributor disposed interiorly therein, the distributor comprising a plate having a plurality of apertures formed therethrough, the filter being vertically spaced below the support member and the distributor being vertically spaced above the support member;

providing a conduit connecting a portion of the housing to another portion of the housing such that a flow path is defined through the housing and the conduit, the conduit being arranged to direct airflow from adjacent the filter to a top portion of the housing;

placing the pollution source on the support member;

isolating the interior of the housing from an area surrounding the housing;

generating an airflow that follows the flow path such that the airflow entrains the contaminants emitted from the pollution source and filters the contaminants when passing through the filter.

17. The method of claim 16 further comprising:

moving the self-contained housing from a first processing operation position to a second processing operation position.

* * * * *